Nov. 10, 1953   R. M. WINSLOW   2,658,610
CONVEYER FOR BANANA BUNCHES
Filed March 22, 1951   2 Sheets-Sheet 1
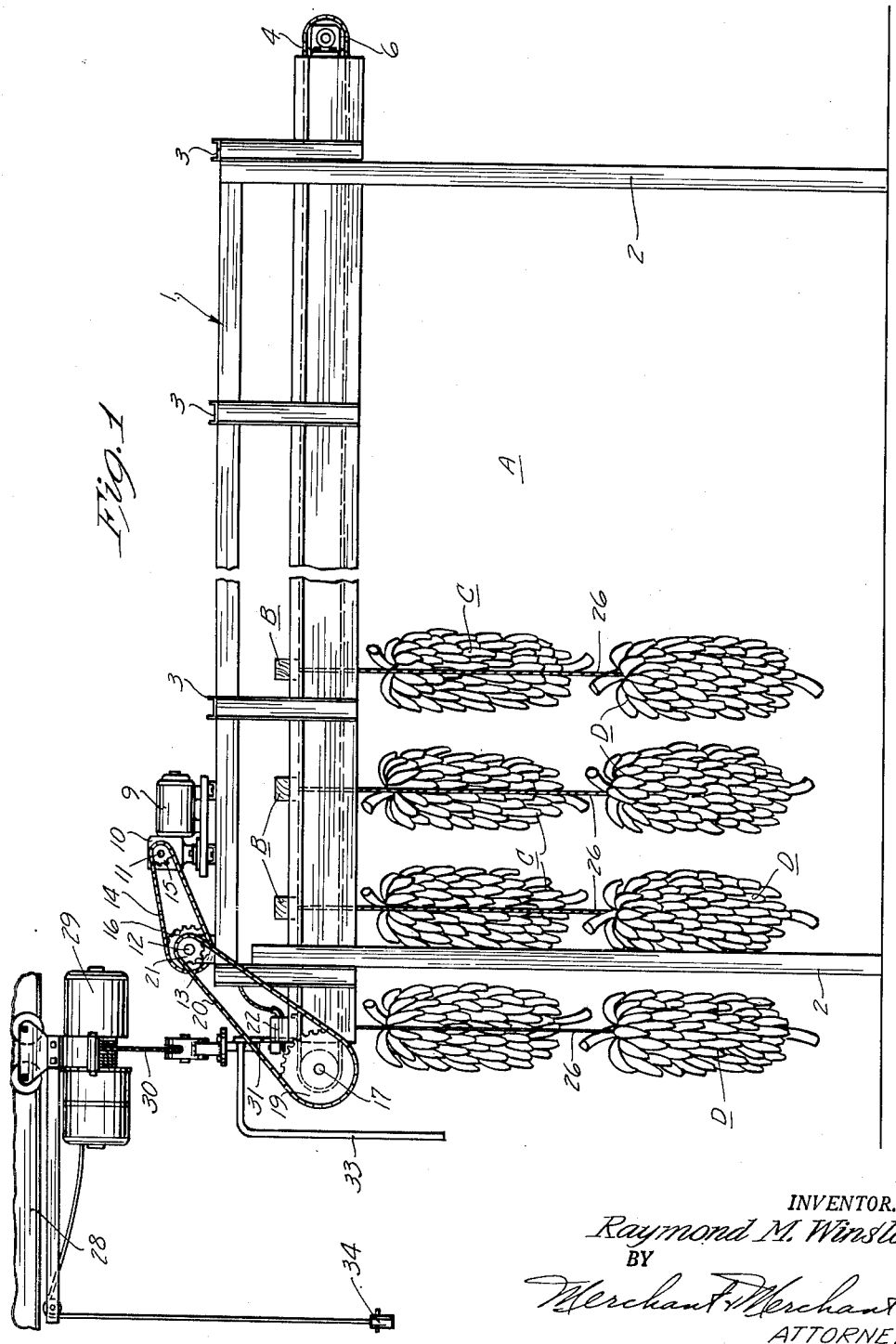
INVENTOR.
Raymond M. Winslow
BY
Merchant & Merchant
ATTORNEYS

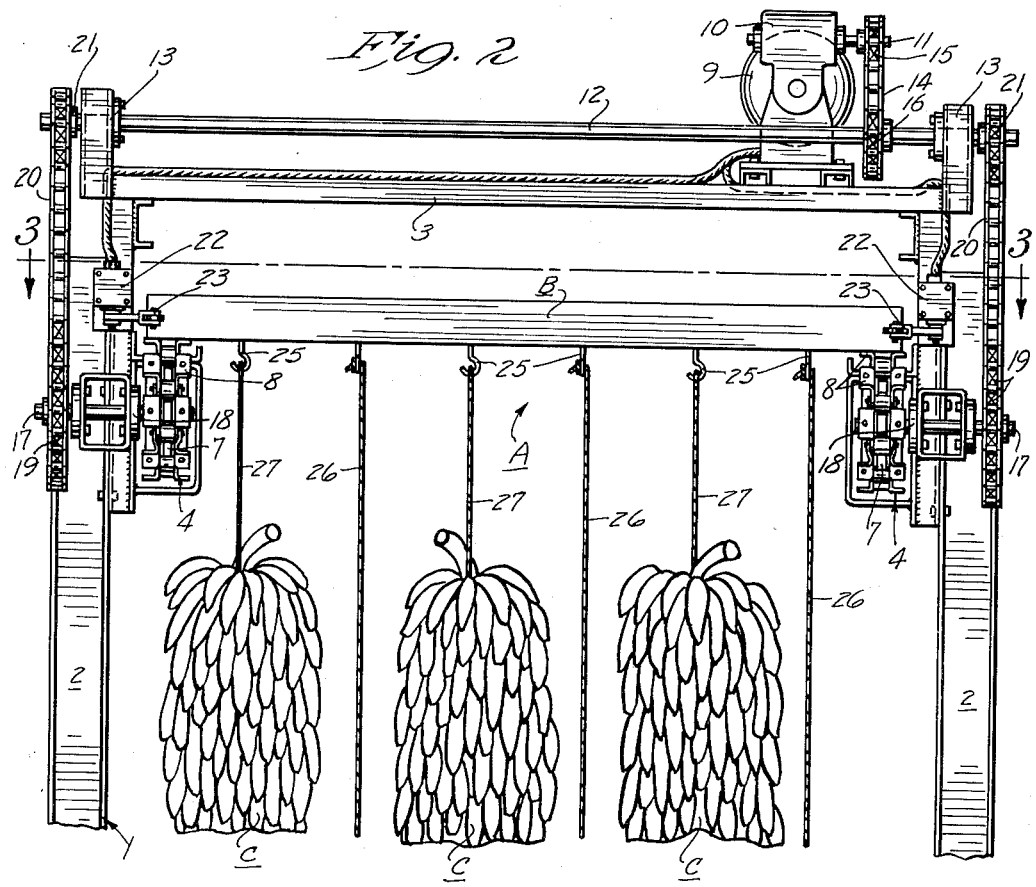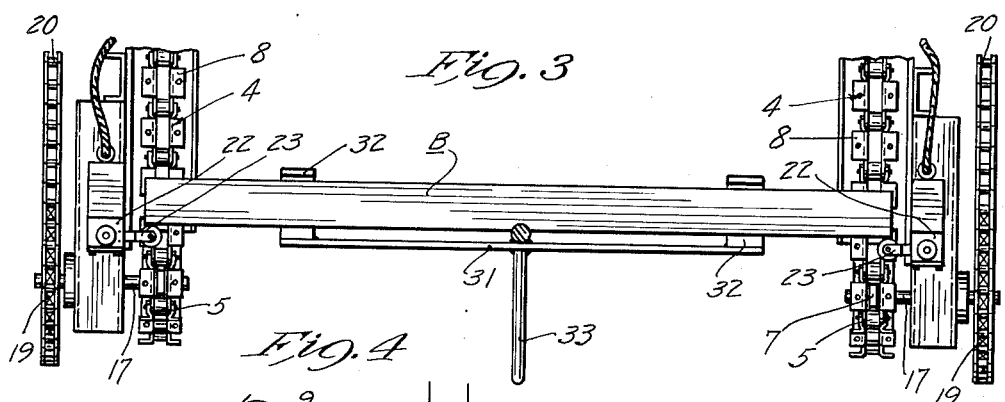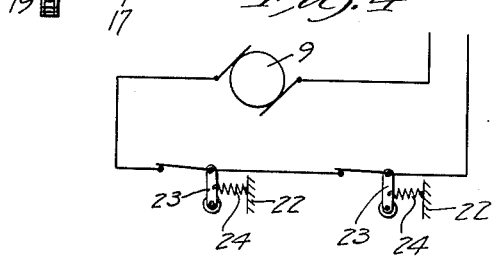

Patented Nov. 10, 1953

2,658,610

UNITED STATES PATENT OFFICE 2,658,610

CONVEYER FOR BANANA BUNCHES

Raymond M. Winslow, Minneapolis, Minn., assignor to Winston and Newell Company, Minneapolis, Minn., a corporation of Delaware Application March 22, 1951, Serial No. 216,929

4 Claims. (Cl. 198—232)

1

My invention relates to devices for conveying and handling banana bunches.

As pointed out in my application S. N. 213,878, filed March 5, 1951, now Patent No. 2,644,598, and entitled "Lifting and Handling Truck for Banana Bunches," banana bunches are usually shipped by carload lots by freight or otherwise to the eventual point of distribution. They are picked green and generally arrive at said point of distribution in a condition where they need artificial ripening before being distributed to the consumer. Therefore, it is necessary to remove the bunches from the freight cars to a curing room and eventually from the curing room to distribution or delivery vehicles or the like. The novel lifting truck of my above-identified application and the "Combination Loading Device and Hoist for Banana Bunches," disclosed and claimed in my copending application S. N. 213,877, filed March 5, 1951, is useful in unloading the bananas from the freight car and transporting them to the curing room without inflicting damage to the fruit.

The object of my instant invention is the provision of a novel structure to facilitate handling of the banana bunches after they have been removed from the curing room and during the process of removing the bananas from the stalks for distribution to the retailers.

A still further object of my invention is the provision of a temporary storage rack, which is provided with conveyor belts which automatically feed the banana bunches to the cutter without in any way damaging the fruit.

The above and still further objects of my invention will become apparent from the following detailed specification, appended claims, and attached drawings.

Referring to the drawings, wherein like characters indicate like parts throughout the several views:

Fig. 1 is a view in side elevation of my novel structure, some parts being broken away;

Fig. 2 is an enlarged fragmentary view in end elevation, as seen from left to right with respect to Fig. 1;

Fig. 3 is a fragmentary view in section, taken substantially on the line 3—3 of Fig. 2; and Fig. 4 is a wiring diagram illustrating the electrical circuit utilized in my novel structure.

Referring with greater particularity to the drawings, the numeral 1 indicates, in its entirety, an inverted generally U-shaped frame defining an elongated passageway A therethrough. Frame 1 includes generally upright supporting members

2 or legs 2 and transverse connecting members 3 which connect the upper ends of members 2. A pair of laterally-spaced endless conveyor belts 4 are rigidly secured to the upper end portions of the legs 2 of the frame 1, one each on an opposite side of the passageway A in spaced relation to each other, and in uniformly-spaced relation to the ground. Preferably and as shown, the conveyor belts 4 are made up of a plurality of connected links 5, which run over idler sprockets 6 on the loading end and drive sprockets 7 on the delivery end of said conveyor belts 4. Preferably and as shown, each of the links 5 is provided with load-carrying feet 8. It will be noted that the upper flights of each of the conveyor belts 4 are spaced sufficiently below the transverse members 3 to provide ample clearance of banana bunch-carrying beams B, adapted to be carried by the upper flights of said conveyor belts 4.

An electric motor 9, mounted on the transverse member 3 overlying the delivery end portion of the belts 4, is connected to a reduction gear box 10 which in turn is provided with a laterally-projecting drive shaft 11. A rotary shaft 12 extends transversely across the passageway A above the frame 1 and is journalled in suitable bearings 13, one on each side of the frame 1. A chain 14 runs over sprockets 15 aand 16 fast on shafts 11 and 12 respectively. Drive shafts 17, for the drive sprockets 7, project laterally therefrom in opposite directions and are suitably journalled for rotation in bearings 18 (see particularly Fig. 2). To the outwardly-projected ends of the drive shafts 17 are secured sprockets 19 for rotation therewith. Chains 20 run over sprockets 19 and over sprockets 21 on the opposite ends of shaft 12.

A pair of switches, not shown, in switch boxes 22, are connected in series to the motor 9. It will be noted that the switch boxes 22 are located one each adjacent the delivery end of one of said conveyor belts 4. Each of the switches is provided with a lever arm 23 which, as shown, projects inwardly in opposed relationship into the path of travel of banana bunch-carrying beams B carried by the conveyor belts 4. The opposite ends of the beams B are each adapted to engage one of the lever arms 23 for a purpose which will hereinafter be made clear. The lever arms 23, by means of springs 24 (see Fig. 4), are yieldingly biased toward positions to close the switches, whereby to initiate simultaneous movements of the conveyor belts 4. Engagement of the ends of the beams B therewith, however, moves said arms 23 to open their respective switches, whereby to terminate the movements of said conveyor belts 4.

The beams B are of the type described in my above-identified applications and include longitudinally - spaced depending, preferably open-ended, hooks 25, alternately adapted to receive short and long rope elements 26 and 27 whereby to safely carry thereon in spaced relation upper and lower rows C and D of banana bunches.

Overlying the frame 1, adjacent the delivery end thereof, is a suitable rail 28 mounted by means not shown. Rail 28 extends longitudinally of the passageway A and is intermediate the conveyor belts 4. Mounted for travelling movements on said rail is a power-operated hoist 29 including a cable 30, to the lower end of which is a beam-lifting element 31 which includes a pair of laterally-spaced upwardly-opening beam-engaging hooks 32 and a handle element 33 which depends therefrom intermediate said hook elements 32. Raising and lowering movements of the beam-lifting element 31 are controlled by an electric switch not shown, within a box 34.

Operation of my novel structure is substantially as follows: Loaded banana bunch-carrying beams B are placed upon the conveyor belts 4 by any suitable means but preferably by means of mobile power-driven lifting trucks of the type disclosed in my pending application S. N. 213,878. It will be noted that the truck may drive as far as necessary into the passageway A described by the frame 1 once the beams B are elevated to a position above the level of the top flight of the conveyor belts 4. The beams B are longitudinally-spaced on the top flights of said conveyors 4, the opposite ends thereof resting one each on one of said belts. Suitable space between the several beams B to prevent damage to the bananas by virtue of some swinging motion of the bunches C and D on the rope elements 27 and 26 respectively, is shown in Fig. 1. Thereafter, when a master switch, not shown, is turned on, the electric motor 9 will cause simultaneous delivery motions to be imparted to the conveyor belts 4. This is, of course, necessarily true because the lever arms 23 are biased toward a position to close the circuit. Travel of the beams B on the conveyor belts will be interrupted only when the foremost thereof comes into contact with the lever arms 23, whereby to move same sufficiently to open the circuit and stop the motor 9.

It should be understood that engagement of either end of the beam B with one of the lever arms 23 will effectively stop delivery movements of the belts 4. This feature is important in that it prevents one end of the beam being carried over the delivery end of the belt 4, upon which it rests in the event that the beam B has been placed upon the belts 4 in any manner but at right angles thereto. In other words, the farthest advanced end of the beam B will contact a lever arm 23 and stop movements of the belts 4. The unloading operator, usually a cutter, is positioned immediately adjacent the delivery end of the conveyor belts 4. Said operator, to remove a beam B from its delivered position of Figs. 2 and 3, grabs the handle 33 of the lifting element 31 and pulls the hoist 29 to a position adjacent said beam B. Manipulation of the switch 34 will impart the desired lowering movements to the lifting element 31; and the operator positions the hooks 32 under the beam B, intermediate the hooks 25 and substantially as shown in Fig. 3. The loaded beam B is then elevated the desired amount and moved rearwardly by imparting travelling movements to the hoist 29. Obviously, when the beam B has been removed from the delivery end of the conveyor belts 4, the lever arms 23, under bias of the springs 24, move in the direction of the loading end of said conveyor belt 4, whereby to close the circuit and initiate movements to said belts. Delivery movements are terminated when the next beam B is moved to a position to engage the lever arms 23. This action is repeated each time a loaded beam B is removed from the delivery end of the conveyor belts 4, thereby continually delivering to the operating cutter a beam B loaded with banana stalks. As before indicated, raising and lowering movements may be imparted to the beam-lifting element 31 by manipulation of the switch 34, whereby the individual bananas may be severed from the stalks in the upper and lower rows C and D at greatest convenience to the cutter.

While I have disclosed a commercial embodiment of my novel structure, it should be obvious that the same is capable of modification without departure from the scope and spirit of the invention as defined by the appended claims.

What I claim is:

1. In a device of the class described, an inverted generally U-shaped frame defining an elongated passageway, said frame comprising generally upright supporting members and transverse members, a pair of laterally-spaced endless conveyor belts, means for mounting said conveyor belts to said frame one each on an opposite side of said passageway and in spaced relation to the ground for conveying movements of the upper flights thereof in parallel paths longitudinally of said passageway, the upper flights of said conveyor belts being downwardly-spaced from said transverse members and adapted to support the opposite ends of banana bunch-carrying beams extending transversely of said passageway, an electric motor mounted on one of said transverse members, a shaft extending transversely of said frame and mounted for rotation therein overlying said belts, drive connections between said motor and the intermediate portion of said shaft, independent drive connections between opposite ends of said shaft and one of said belts, a pair of control switches secured to said frame one each adjacent the delivery end of said belts and connected in series with said motor, each of said switches having lever arms lying in the path of travel of the beams carried by said belts and engageable one each with an opposite end of said beams, said lever arms being biased toward positions to close their respective switches whereby to initiate movements of said belts, said lever arms being movable by engagement with said beams to open their respective switches and terminate said movements.

2. In a device of the class described, a pair of laterally-spaced endless conveyor belts, the upper flights of which are adapted to receive the opposite end portions of banana bunch-carrying beams, means for mounting said belts in uniformly-spaced relation to the ground for conveying movements in parallel paths, drive means including an electric motor for imparting simultaneous delivery movements to said belts, control means for said motor, said control means comprising a switch and a lever arm therefor, said lever arm lying in the path of travel of the beams carried by said belts adjacent the delivery end of one of said belts, said lever arm being biased toward a position to close said switch and movable by the beams engageable therewith to open said switch, and a second switch connected in series with said first-mentioned switch and said motor, said second switch being provided with a lever arm mounted in the path of travel of beams carried by said belts and adjacent the delivery end of the other of said belts.

3. In a device of the class described, a pair of laterally-spaced endless conveyor belts, the upper flights of which are adapted to receive the opposite end portions of banana bunch-carrying beams, means for mounting said belts in spaced relation to the ground for conveying movements in parallel paths, power-operated means for imparting simultaneous delivery movements to said belts, and control means for said power-operated means, said control means including a pair of actuators lying in the path of travel of said beams and one each adapted to engage an opposite end, said actuators being biased toward positions to render the power-operated means operative and movable by said beams in a direction to render said power-operated means inoperative, said actuators being identically spaced with respect to the terminal end of the conveyor belts whereby engagement of either thereof by the most advanced end of a given beam will render said power-operated means inoperative.

4. The structure defined in claim 3 in which said actuators are in the nature of pivoted levers which move in a horizontal plane whereby to permit disengagement thereof with said beams when lifting movements are imparted to said beams during the removal operation.

RAYMOND M. WINSLOW.

References Cited in the file of this patent

UNITED STATES PATENTS

| Number | Name | Date |
|---|---|---|
| 317,573 | Pulliam | May 12, 1885 |
| 629,270 | Proctor | July 18, 1899 |
| 933,354 | Aab | Sept. 7, 1909 |
| 1,222,560 | Olson | Apr. 10, 1917 |
| 1,355,488 | McKenney | Oct. 12, 1920 |
| 1,550,248 | Gehnrich | Aug. 18, 1925 |
| 2,017,156 | Mattler | Oct. 15, 1935 |
| 2,203,508 | Rosenthal | June 4, 1940 |
| 2,520,238 | Culp | Aug. 29, 1950 |